United States Patent Office 2,859,201
Patented Nov. 4, 1958

---

2,859,201

GRAFT-TYPE POLYMER OF CONJUGATED DIENE AND ACRYLIC ACID AND PROCESS OF PREPARATION

Carl A. Uraneck, Phillips, Richard J. Sonnenfeld, Borger, and Durward F. Dodgen, Jr., Phillips, Tex., assignors to Phillips Petroleum Company, a corporation of Delaware No Drawing. Application November 9, 1953
Serial No. 391,144

16 Claims. (Cl. 260—45.5)

This invention relates to graft-type polymers as new compositions of matter and a method for their production by the polymerization of unsaturated materials in aqueous systems containing unsaturated polyelectrolytes. The unsaturated polyelectrolytes of this invention are water-soluble salts of polymers containing a multiplicity of acidic groups with intervening olefinic carbon-to-carbon double bonds, the molecular weight of said salts being at least 1000. When a polymerizable compound is caused to polymerize in the presence of an aqueous solution of a polyelectrolyte of the type described, grafting occurs, presumably at the points of unsaturation of the polyelectrolyte, to give new types of polymeric products.

The principal object of the present invention is to provide graft-type polymers as new compositions of matter. A further object of the invention is to provide a method for the production of graft-type polymers. An additional object of the invention is to provide a method of employing organic, unsaturated polyelectrolytes in the preparation of graft-type polymers. Other objects will appear hereinafter.

The unsaturated polyelectrolytes of this invention may be prepared by first copolymerizing a conjugated diene with an acid-type monomer, i. e., a monomer containing at least one acid group per molecule and, second, treating the resulting acidic copolymer with a basic material to convert it to a water-soluble salt, which is then employed in the production of the graft-type polymers herein described. Polymerization can be effected by any method, such as mass or emulsion polymerization. Instead of preparing the acidic copolymer directly, it can be prepared indirectly, i. e., by treating a polymer to convert certain groups to acid groups or to introduce acidic groups into the polymer by any method which will yield the desired product. For example, a polymer containing —CN groups can be converted to one containing carboxy groups by hydrolysis.

Monomers which contain at least one carboxy group per molecule, which are applicable include acrylic acid, alpha and beta chloroacrylic acids, and various alpha and beta alkyl-substituted derivatives in which the alkyl group contains from 1 to 8 carbon atoms, such as methacrylic acid, crotonic acid, alpha and beta ethyl-, propyl-, and butyl-, amyl-, hexyl-, heptyl-, and octylarcrylic acids, phenylacrylic acids, i. e., atropic and cinnamic acids, and vinylacrylic acids. Unsaturated dicarboxylic acids such as itaconic, fumaric, maleic, citraconic, and teraconic acids are also applicable, along with derivatives thereof such as monoesters from methyl to octyl, alkyl derivatives, i. e., alkyl groups from methyl to octyl attached to the central carbon atoms, and halogen-substituted derivatives such as chloromaleic acids. Of the acidic monomers which can be employed, acrylic, methacrylic, and chloroacrylic acids are most frequently preferred.

The acidic monomer may also contain sulfonic, phosphonic, acid sulfate, or acid phosphate groups as well as carboxy groups.

Materials which are copolymerized with the acidic monomers to produce unsaturated polyelectrolytes are conjugated dienes which preferably contain from 4 to 6, inclusive, carbon atoms per molecule, but those containing more carbon atoms per molecule, e. g., 8, can also be used. These compounds include 1,3-butadiene, chloroprene, isoprene, piperylene, methylpentadiene, 2,3-dimethyl-1,3-butadiene, and others. Furthermore, various alkoxy, such as methoxy and ethoxy, and cyano derivatives of these conjugated dienes can also be employed. A single conjugated diene can be polymerized with an acidic monomer or conjugated dienes can be used in admixture with each other or with other polymerizable compounds in addition to the acidic monomers, i. e., the unsaturated polyelectrolytes can be prepared from terpolymers as well as copolymers.

As a third type of component, in the case of terpolymers, in the polymers, any unsaturated compound which contains a terminal $CH_2=C<$ group can be used. Among the compounds which are applicable are styrene, various halogen-, alkyl-, and alkoxy-substituted styrenes, acrylonitrile, methacrylonitrile, methyl acrylate, ethyl acrylate, propyl acrylates, butyl acrylates and the corresponding methylacrylates, methyl vinyl ether, methyl isopropenyl ketone, vinyl chloride, vinylidene chloride, vinyl acetate, methyl vinyl ketone, etc. Many other compounds are applicable, but it is necessary that only those compounds be used which do not react with the carboxy groups of the monomers.

The acidic monomer is generally employed in an amount in the range between 20 and 99 parts by weight per 100 parts total monomeric material. The remaining monomeric material is a conjugated diene, a mixture of conjugated dienes, or a mixture of one or more conjugated dienes with one or more other polymerizable compounds, as hereinbefore described. In any event, at least one part by weight, and preferably 5 or more parts by weight, of conjugated diene is employed. The conjugated diene furnishes the carbon-to-carbon double bonds which are presumably necessary in the polyelectrolyte if graft-type polymerization is to occur. The polymer which is formed must be of such nature that it will be soluble in the basic material with which it is to be treated. In order for a polymer to be soluble, the ratio of carbon atoms to carboxy groups should not be greater than 25:1, and preferably 20:1 or less. Another factor which affects solubility is the molecular weight of the polymer. As the molecular weight increases, the ratio of acid groups to carbon atoms must be increased for the polymer to be soluble. In any case, the ratio of acidic monomer to other monomer is adjusted in such a way that the resulting polymer will be soluble in the base which is used to convert it to the polymeric salt.

Bases which are employed to convert the unsaturated acidic polymer to water-soluble salts include alkali metal hydroxides such as lithium, sodium, and potassium hydroxides, ammonium hydroxide, and water-soluble amines such as methylamine, ethylamine, dimethylamine, diethylamine, n-propylamine, isopropylamine, n-butylamine, sec-butylamine, tert-butylamine, and mono-, di-, and triethanolamines. The bases are used in the form of their aqueous solutions and generally range in concentration from 0.5 to 5 normal.

The amount of base employed is generally that which is sufficient to effect from 50 to 100 percent neutralization of the acid groups in the polymer. One of the factors which governs the amount of base required to dissolve the polymer is the ratio of acid groups to carbon atoms in the polymer. The larger the proportion of acid groups to carbon atoms, the more readily the polymer will dissolve. The polyelectrolyte solution used in polymerization systems for producing graft-type polymers generally ranges in concentration from 1 to 10 percent by weight, although higher or lower concentrations can be employed.

When preparing the unsaturated polyelectrolyte solutions herein described, an aqueous solution of the base can be added either to the solid polymer or directly to the latex in cases where the polymer is prepared by emulsion polymerization. After addition of the base, the mixture is heated until the polymer is dissolved.

As stated above, the polyelectrolyte should have a minimum molecular weight of 1000. The polyelectrolytes of the present invention are bifunctional, that is, they provide the skeletal structure for the graft polymer and are also emulsifiers for the polymerization systems. This bifunctional property is of particular significance in a free radical system since, rather than being enclosed within the droplets, the polyelectrolyte is located at the interface, thereby being at the most susceptible point for attack by free radicals and thus formation of graft-type polymers, rather than simple homo- or copolymers of the monomers present is facilitated. One feature of the present process is that the polyelectrolyte can function as the sole emulsifier in the graft polymerization, eliminating the need for conventional emulsifiers. Were the polyelectrolyte a low molecular weight material, say a codimer, it would probably function as a soap, emulsifying the sysem to some extent or another, but having little significance in the formation of a graft-type polymer.

In general, any unsaturated compound which contains a terminal $CH_2=C<$ group, and which can be polymerized in aqueous alkaline emulsion systems, can be employed to polymerize with the polyelectrolyte in the production of the graft-type polymers of this invention. Conjugated dienes such as 1,3-butadiene, isoprene, chloroprene, 2,3-dimethyl-1,3-butadiene, methylpentadiene, and the like, either alone or in admixture with each other or with other copolymerizable materials, are frequently employed. Various alkoxy derivatives, e. g., methoxy and ethoxy, and cyano derivatives of these dienes can be employed also. Likewise, compounds such as styrene, various halogen-, alkyl-, and alkoxy-substituted styrenes, vinyl-substituted pyridines and quinolines, vinylfuran, acrylonitrile, methacrylonitrile, methylacrylate, ethyl acrylate, propyl acrylates, butyl acrylates, and the corresponding methylacrylates, methyl vinyl ether, methyl isopropenyl ketone, vinyl chloride, vinylidene chloride, vinyl acetate, methyl vinyl ketone, etc., can be used. Many other polymerizable compounds are applicable and it is to be understood that they can be used alone or in admixture with other polymerizable compounds.

In the preparation of graft-type polymers by polymerization of polymerizable materials in aqueous systems containing unsaturated polyelectrolytes, the amount of polyelectrolyte employed can range from 1 to 100 parts by weight per 100 parts of polymerizable material, preferably at least 5 parts by weight.

A possible formula for a graft-type polymer, e. g., a butadiene monomer polymerized with a butadiene-acrylic acid polyelectrolyte, is given below:

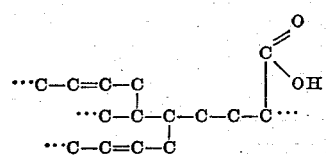

Products which can be obtained when operating according to the process of this invention are numerous and varied. Materials ranging from soft rubbers to hard resins which have good molding characteristics can be readily produced. Properties of the graft-type polymers will vary, depending upon the monomers polymerized and the polyelectrolytes employed. Various specialty rubbers can be produced, as well as numerous types of molded objects.

The following examples further illustrate the invention. Examples I–IV and VI–IX describe methods of preparation and properties of the graft-type polymers of the invention. Data indicating that the final product is a graft-type polymer and not a mere mixture of two polymers are brought out in Examples V and X.

In all the examples coagulation of the graft-polymer systems was by brine-acid. While coagulation by this method to convert the alkali metal salt to the free acid was the method used, the polymer could be coagulated by adding alcohol in an amount such as to reduce solubility of the salt sufficiently for coagulation to occur.

EXAMPLE I

A low Mooney butadiene/acrylic acid copolymer was prepared by emulsion polymerization at 41° F. in accordance with the following recipe:

| | Parts by weight |
|---|---|
| Butadiene | 70 |
| Acrylic acid | 30 |
| Water | 180 |
| Duponol ME[1] | 4 |
| tert-Dodecyl mercaptan | 1 |
| Diisopropylbenzene hydroperoxide | 0.085 |
| KCl | 0.08 |
| $FeSO_4 \cdot 7H_2O$ | 0.111 |
| $K_4P_2O_7$ | 0.132 |

[1] Sodium lauryl sulfate.

A conversion of 40 percent was reached in 1.9 hours. The reaction was shortstopped at 3.6 hours with 0.075 percent by weight di-tert-butylhydroquinone, based on monomers charged. No antioxidant was used. The latex was brine-alcohol coagulated. A very soft polymer was obtained which had a Mooney value too low to measure.

A 10 weight percent solution of the potassium salt of a butadiene/acrylic acid copolymer was prepared by treating the wet butadiene/acrylic copolymer with a 1 N aqueous solution of KOH in sufficient quantity to effect 100 percent neutralization and the mixture was then heated until the polymer dissolved. Water was added to give a solution of the desired concentration.

The copolymerization of butadiene with styrene was effected at 41° F. in an aqueous system in the presence of the potassium salt of the butadiene/acrylic copolymer solution described above. Two series of runs were made with variable amounts of mercaptan. Polymerization recipes were as follows:

| | Parts by Weight | |
|---|---|---|
| | Recipe 1 | Recipe 2 |
| Butadiene | 70 | 70 |
| Styrene | 30 | 30 |
| Water | 300 or 400 | 400 |
| Potassium salt of butadiene/acrylic acid copolymer | 7.5 | 7.5 |
| tert-Dodecyl mercaptan | variable | variable |
| Diisopropylbenzene hydroperoxide | 0.107 | |
| tert Butylisopropylbenzene hydroperoxide | | 0.114 |
| $FeSO_4 \cdot 7H_2O$ | 0.139 | 0.139 |
| $K_4P_2O_7$ | 0.165 | 0.165 |
| KCl | 0.2 | 0.2 |

A description of the runs and the results obtained are shown in the following table:

Table I

RUNS FROM RECIPE 1

| Run No. | Water, Parts | tert-$C_{12}$ Mercaptan, Parts | Conversion [1] | | Original | | Milled Three Passes | | Mooney Value, ML-4 |
|---|---|---|---|---|---|---|---|---|---|
| | | | Time, Hours | Percent | Gel, Percent | Swelling Index | Gel, Percent | Swelling Index | |
| 1 | 300 | 0.2 | 4 | 68 | 82.7 | 25 | 83.7 | 31 | over 200 |
| 2 | 400 | 0.2 | 4 | 58 | 81.4 | 42 | 74.3 | 44 | over 200 |
| 3 | 300 | 0.4 | 4 | 67 | 86.6 | 35 | 82.7 | 38 | 156 |
| 4 | 400 | 0.4 | 4 | 58 | 71.2 | 60 | 65.9 | 61 | 164 |
| 5 | 300 | 0.6 | 4 | 68 | 77.4 | 45 | 74.2 | 42 | 176 |
| 6 | 400 | 0.6 | 4 | 53 | 66.3 | 64 | 50.3 | 92 | 145 |

RUNS FROM RECIPE 2

| 1 | 400 | 0.75 | 8 | 52 | | | | | over 180 |
| 2 | 400 | 1.0 | 8 | 57 | | | | | over 180 |
| 3 | 400 | 2.0 | 8 | 56 | | | | | 168 |
| 4 | 400 | 3.0 | 8 | 56 | | | | | 131 |
| 5 | 400 | 5.0 | 8 | 60 | | | | | 36 |

[1] Conversion based on weight of coagulum includes polyelectrolyte from butadiene/acrylic acid copolymer present in the system.

EXAMPLE II

This example illustrates a second embodiment of the invention wherein a mixture of polyelectrolytes is employed.

A butadiene/acrylic acid copolymer was prepared at 41° F. in accordance with the following polymerization recipe:

| | Parts by weight |
|---|---|
| Butadiene | 70 |
| Acrylic acid | 30 |
| Water | 180 |
| Duponol ME [1] | 4 |
| tert-Dodecyl mercaptan | 0.8 |
| tert-Butylisopropylbenzene hydroperoxide | 0.114 |
| KCl | 0.1 |
| $FeSO_4 \cdot 7H_2O$ | 0.139 |
| $K_4P_2O_7$ | 0.165 |

[1] As in Example I.

The reaction was shortstopped with 0.075 percent by weight, based on monomers charged, of di-tert-butylhydroquinone. No antioxidant was used. The latex was brine-alcohol coagulated and the wet polymer treated with 1 N KOH, as described in Example I. Water was added to give a 10 weight percent solution of potassium salt of butadiene/acrylic acid copolymer solution. Another solution of potassium salt of butadiene/acrylic acid copolymer was prepared, as described in Example I. Both solutions were blended and the blend employed as the polyelectrolyte for the production of three butadiene/styrene copolymers using recipe 1 of Example I with 400 parts water. At 11.8 hours a booster of 0.053 part diisopropylbenzene hydroperoxide, 0.069 part $FeSO_4 \cdot 7H_2O$, 0.083 part $K_4P_2O_7$, and 0.10 part KCl was added to each run. Results are shown below:

Table II

| Run No. | tert-$C_{12}$ Mercaptan, Parts | Conversion | | Original | | | Milled Three Passes | | Mooney Value, ML-4 |
|---|---|---|---|---|---|---|---|---|---|
| | | Time, Hours | Percent | Inherent Viscosity | Gel, Percent | Swelling Index | Inherent Viscosity | Gel, Percent | |
| 1 | 1.0 | 26 | 56 | 1.60 | 28.2 | 97 | 1.47 | 0 | 26.5 |
| 2 | 2.0 | 26 | 55 | 0.89 | 17.0 | 82 | 1.08 | 0 | 11.5 |
| 3 | 2.5 | 26 | 56 | 0.83 | 19.7 | 73 | 0.99 | 0 | 10.0 |

EXAMPLE III

This example illustrates the effect of varying the ratio of mercaptan in a typical recipe.

The potassium salt of butadiene/acrylic acid copolymer used in Example II (blend of two polymer solutions) was employed in a series of runs for the copolymerization of butadiene with styrene at 41° F. Recipe 2 of Example I was used and the quantity of mercaptan was varied from 0.3 to 0.7 part. Results were as follows:

Table III

| Run No. | tert-$C_{12}$ Mercaptan, Parts | Conversion, Percent in— | | | Money Value, ML-4 |
|---|---|---|---|---|---|
| | | 3.4 Hours | 5.3 Hours | 15.2 Hours | |
| 1 | 0.3 | 31 | 37 | 60 | 77 |
| 2 | 0.4 | 31 | 37 | 62 | 61 |
| 3 | 0.5 | 31 | 37 | 59 | 49 |
| 4 | 0.6 | 32 | 38 | 58 | 35 |
| 5 | 0.7 | 31 | 37 | 59 | 31 |

EXAMPLE IV

This example, like the preceding one, further illustrates the effect of varying the ratio of mercaptan in a typical recipe.

Three runs were made for the polymerization of butadiene at 41° F. in the presence of a solution of potassium salt of butadiene/acrylic acid copolymer prepared as described in Example II (blend of two polymer solutions). The recipe employed was as follows:

| | Parts by weight |
|---|---|
| Butadiene | 50 |
| Potassium salt of butadiene/acrylic acid copolymer | 25 |
| Water | 300 |
| tert-Dodecyl mercaptan | 1.0, 2.5, or 5.0 |
| Diisopropylbenzene hydroperoxide | 0.107 |
| KCl | 0.5 |
| $FeSO_4 \cdot 7H_2O$ | 0.139 |
| $K_4P_2O_7$ | 0.165 |

The following results were obtained:

*Table IV*

| Run No. | Time, Hours | Conversion, Percent | tert-$C_{12}$ Mercaptan, Parts | Mooney Value, ML-4 |
|---|---|---|---|---|
| 1 | 7 | 60 | 1.0 | 121 |
| 2 | 7 | 60 | 2.5 | 110 |
| 3 | 7 | 60 | 5.0 | 38 |

EXAMPLE V

This example describes the test used to indicate that the final product is a graft-type polymer and not a mere mixture of several polymers.

In step 1, samples of the butadiene/acrylic acid copolymers, prepared as described in Examples I and II, were blended and this blend milled into a 70/30 butadiene/styrene copolymer in such quantity that the amount of combined acrylic acid present in the product was the same as that present in a graft-type polymer prepared by the copolymerization of butadiene with styrene in the presence of a solution of potassium salt of butadiene/acrylic acid copolymer as described in Example II.

In step 2 a graft-type polymer was prepared employing the following recipe:

| | Parts by weight |
|---|---|
| Butadiene | 70 |
| Styrene | 30 |
| Water | 400 |
| Potassium salt of butadiene/acrylic acid copolymer | 7.5 |
| tert-Dodecyl mercaptan | 1 |
| Diisopropylbenzene hydroperoxide | 0.107 |
| $FeSO_4 \cdot 7H_2O$ | 0.139 |
| $K_4P_2O_7$ | 0.165 |
| KCl | 0.2 |

A conversion of 56 percent was obtained in 26 hours. The product had a Mooney value of 27. The original gel was 28 percent, the inherent viscosity was 1.60, and the swelling index was 97 percent. After milling three passes, the gel was 1.47 percent.

In step 3 a 70/30 butadiene/styrene latex was blended with an aqueous solution of the potassium salt of butadiene/acrylic acid copolymer described above and the mixture was coagulated by the salt-acid method. The amount of combined acrylic acid in this product was the same as in the other two runs.

Each sample was cut into small pieces and boiled for 3 hours in an excess of a 1 N solution of KOH. Dilute hydrochloric acid was added to the supernatant liquid in each case. All of the butadiene/acrylic acid copolymer from the polymer blend and the latex blend was extracted with KOH and precipitated upon addition of acid, while substantially no precipitate was formed after treatment of the graft-type polymer with KOH followed by addition of HCl to the supernatant liquid. These results show that acrylic acid is strongly linked in the graft-type polymer.

EXAMPLE VI

This test illustrates that the graft-type polymer of the invention is similar in its significant properties to commercial polystyrene.

A solution of potassium salt of butadiene/acrylic acid copolymer was prepared as described in Example II (blend of two polymer solutions) and different amounts employed in two runs for the polymerization of styrene at 41° F. The recipe was as follows:

| | Parts by weight |
|---|---|
| Styrene | 100 |
| Water | 400 |
| Potassium salt of butadiene/acrylic acid copolymer | 5 or 10 |
| tert-Butylisopropylbenzene hydroperoxide | 0.114 |
| $FeSO_4 \cdot 7H_2O$ | 0.139 |
| $K_4P_2O_7$ | 0.165 |

The runs were shortstopped at approximately 90 percent conversion with 0.4 percent by weight di-tert-butylhydroquinone based on the monomers charged.

The products were white, dry powders. Samples for tensile strength, impact, and heat distortion were obtained by injection molding. Determinations were also made for volatile matter, melting point, density, and softening point. The polymers prepared using 5 and 10 parts of potassium salt of butadiene/acrylic acid copolymer are designated as A and B, respectively. The tensile strength, impact, and heat distortion values of commercial general purpose polystyrene were obtained for comparative purposes. The results were as follows:

*Table V*

| | A | B | General Purpose Polystyrene |
|---|---|---|---|
| Volatile matter, percent | 0.55 | 0.33 | |
| Melting point, ° F | >350 | >350 | |
| Density | 1.068 | 1.065 | |
| Softening point, ° F | 250 | 300 | |
| Tensile, p. s. i. | 4,620 | 4,170 | 4,750 |
| Impact, ft. lbs. per in. of notch [1] | 0.31 | 0.23 | 0.25 |
| Heat distortion, 66 p. s. i., ° F | 206.6 | 207 | 190 |

[1] Charpy method, ASTM D 256-43T.

EXAMPLE VII

This example illustrates a series of runs, in each of which the butadiene was polymerized with a different monomer in the presence of the polyelectrolyte.

A potassium salt of butadiene/acrylic acid copolymer was prepared by emulsion polymerization at 41° F., using the recipe given in Example I. A conversion of 64 percent was obtained in 3.2 hours. The reaction was shortstopped at 3.7 hours with 0.075 percent by weight di-tert-butylhydroquinone, based on monomers charged. No antioxidant was used. The polymer was very soft. It was treated with 1 N KOH in the same manner described in Example I.

Runs were made for the copolymerization of butadiene with styrene, acrylonitrile, 2-methyl-5-vinylpyridine, methyl isopropenyl ketone, and ethyl acrylate at 41° F. in an aqueous system in the presence of the potassium salt of butadiene/acrylic acid solution described above. The following polymerization recipe was employed:

| | Parts by weight |
|---|---|
| Butadiene | 70 |
| Other monomer | 30 |
| Water | 400 |
| Potassium salt of butadiene/acrylic acid copolymer | 7.5 |
| tert-Dodecyl mercaptan | 0.3 |
| tert-Butylisopropylbenzene hydroperoxide | 0.114 |
| $FeSO_4 \cdot 7H_2O$ | 0.139 |
| $K_4P_2O_7$ | 0.165 |
| KCl | 0.20 |

Results of the polymerization were as follows:

Table VI

| Run No. | Second Monomer | Conversion, Percent in— | | | | |
|---|---|---|---|---|---|---|
| | | 3.3 Hours | 6.3 Hours | 19.5 Hours | 24.3 Hours | 52.8 Hours |
| 1 | Styrene | 12 | 17 | 21 | 22 | 27 |
| 2 | Acrylonitrile | 25 | 33 | 51 | 51 | 68 |
| 3 | 2-Methyl-5-vinyl-pyridine | 0 | 0 | 0 | 36 | 49 |
| 4 | Methyl isopropenyl ketone | 28 | 36 | 53 | 58 | |
| 5 | Ethyl acrylate | 17 | 17 | 28 | 30 | 40 |

In a representative test, the butadiene/2-methyl-5-vinylpyridine graft-type polymer was molded at 300° F. into a very tough sheet. It had excellent flex life and tensile strength.

EXAMPLE VIII

This example demonstrates the effect of varying the composition of the polyelectrolyte.

Two butadiene/acrylic acid copolymers were prepared by emulsion polymerization at 41° F. using monomer ratios of 60/40 and 50/50. The following recipes were employed:

| | Parts by Weight | |
|---|---|---|
| | 60/40 | 50/50 |
| Butadiene | 60 | 50 |
| Acrylic acid | 40 | 50 |
| Water | 180 | 315 |
| Duponol ME [1] | 4 | 8 |
| tert-Dodecyl mercaptan | 0.8 | 1.0 |
| tert-Dodecylisopropylbenzene hydroperoxide | 0.165 | |
| tert-Butyliosopropylbenzene hydroperoxide | | 0.115 |
| KCl | 0.1 | 0.1 |
| FeSO$_4$·7H$_2$O | 0.139 | 0.139 |
| K$_4$P$_2$O$_7$ | 0.165 | 0.165 |
| Time, hours | 6.8 | 29 |
| Conversion, Percent | 69 | 84 |
| ML-4 | 13 | 24 |
| Acrylic acid, Percent | 33.7 | 35.2 |

[1] As in Example I.

The latices were brine-alcohol coagulated and dissolved in KOH solution using the following proportions of materials:

(1) 60/40 copolymer: 3.5 grams of the copolymer was treated with 16.2 ml. of 1.015 N KOH and the mixture heated to effect solution. The solution was made to 83.5 grams by the addition of water.

(2) 50/50 copolymer: 3.5 grams of the copolymer was treated with 19.5 ml. of 1.015 N KOH and the mixture heated to effect solution. The solution was made to 83.5 grams by the addition of water.

Runs were made for the copolymerization of butadiene with styrene at 41° F. in aqueous systems in the presence of the polyelectrolyte solutions described above. The following polymerization recipe was employed:

| | Parts by weight |
|---|---|
| Butadiene | 70 |
| Styrene | 30 |
| Water | 180 |
| Potassium salt of butadiene/acrylic acid copolymer | 7 |
| tert-Dodecyl mercaptan | 0.30 |
| Diisopropylbenzene hydroperoxide | 0.107 |
| KCl | 0.20 |
| FeSO$_4$·7H$_2$O | 0.139 |
| K$_4$P$_2$O$_7$ | 0.165 |

The following results were obtained:

Table VII

| Polyelectrolyte from— | Conversion, Percent, in— | |
|---|---|---|
| | 5.3 Hours | 17.7 Hours |
| 60/40 Copolymer | 13 | 86 |
| 50/50 Copolymer | 2 | 67 |

EXAMPLE IX

In this example, the degree of neutralization of the butadiene-acrylic acid polyelectrolyte was varied in each of five runs, using KOH as the base.

Two butadiene/acrylic acid copolymers were prepared by emulsion polymerization at 41° F. using the following recipes:

| | Parts by Weight | |
|---|---|---|
| | Run 1 | Run 2 |
| Butadiene | 70 | 70 |
| Acrylic acid | 30 | 30 |
| Water | 180 | 180 |
| Duponol ME [1] | 4 | 4 |
| tert-Dodecyl mercaptan | 0.45 | 0.5 |
| tert-Butylisopropylbenzene hydroperoxide | 0.115 | 0.115 |
| KCl | 0.1 | 0.1 |
| FeSO$_4$·7H$_2$O | 0.139 | 0.139 |
| K$_4$P$_2$O$_7$ | 0.165 | 0.165 |
| Time, hours | 3.6 | 3.6 |
| Conversion, percent | 66 | 62 |
| ML-4 | 56 | 42 |

[1] As in Example I.

The reactions were shortstopped with 0.2 percent by weight, based on monomers charged, of di-tert-butylhydroquinone and 2 percent by weight, based on the polymer, of phenyl-beta-naphthylamine was added as the antioxidant. The latices were coagulated by the brine-alcohol method. The polymers were blended and treated with 1 N KOH to effect different degrees of neutralization.

Runs were made for the copolymerization of butadiene with styrene at 41° F. in aqueous systems using the several butadiene/acrylic acid polyelectrolyte solutions. The runs were made in accordance with the following polymerization recipe:

| | Parts by weight |
|---|---|
| Butadiene | 70 |
| Styrene | 30 |
| Water | 180 |
| Butadiene/acrylic acid copolymer | 5 |
| KOH | Variable |
| Mercaptan blend | 0.2 |
| Diisopropylbenzene hydroperoxide | 0.115 |
| KCl | 0.1 |
| FeSO$_4$·7H$_2$O | 0.139 |
| K$_4$P$_2$O$_7$ | 0.165 |

The following results were obtained:

Table VIII

| Run No. | KOH, Parts | Percent Neutralized | Conversion, Percent, in— | |
|---|---|---|---|---|
| | | | 16 Hours | 41 Hours |
| 1 | 1.29 | 110 | 19 | 21 |
| 2 | 1.23 | 105 | 23 | 30 |
| 3 | 1.17 | 100 | 26 | 36 |
| 4 | 1.11 | 95 | 23 | 34 |
| 5 | 1.05 | 90 | 21 | 30 |

EXAMPLE X

Twelve runs were made for the polymerization, at 41° F. of butadiene, methyl acrylate, acrylonitrile, and 2-methyl-5-vinylpyridine in the presence of a solution of potassium salt of butadiene-acrylic acid copolymer prepared as described in Example II (blend of two polymer solutions). The runs were made in accordance with the following recipe which shows the effect of varying the weight of monomer while maintaining the weight of other components constant:

|   | Parts by weight |
|---|---|
| Butadiene | 25, 50, or 100 |
| Methyl acrylate | 25, 50, or 100 |
| Acrylonitrile | 25, 50, or 100 |
| 2-methyl-5-vinylpyridine | 25, 50, or 100 |
| Potassium salt of butadiene-acrylic acid copolymer | 25 |
| Water | 200 |
| tert-Dodecyl mercaptan | 0.30 |
| Diisopropylbenzene hydroperoxide | 0.107 |
| KCl | 0.5 |
| $FeSO_4 \cdot 7H_2O$ | 0.139 |
| $K_4P_2O_7$ | 0.165 |

The polymers were brine-acid coagulated and each was treated with several solvents. In no case could the potassium salt of butadiene-acrylic acid copolymer be separated from the polymer mass by extraction with any of the solvents tried. When the polymers were heated with KOH solution and the supernatant liquid treated with HCl, only trace amounts of precipitate formed. The following table shows results of the several runs:

Table IX

| Monomer | Parts | Time, Hours | Yield, Percent [1] | Solubility [2] | | | | | | Description of Polymers |
|---|---|---|---|---|---|---|---|---|---|---|
|  |  |  |  | KOH, 1 N | Ethanol | Benzene | Dioxane | Pyridine | Et–A [3] |  |
| Butadiene | 25 | 6.6 | 84 | SS | SS | VSS, SW | S | S | SS | Tough, highly gelled elastomers. |
|  | 50 | 6.6 | high | SS | SS | INS, SW | S | S | SS |  |
|  | 100 | 6.6 | high | SS | SS | INS, SW | SS | SS | SS |  |
| Methyl acrylate | 25 | 6.6 | 92 | INS, SW | INS | SW | SS, SW | SS, SW | INS | Boardy, semi-plastic materials. |
|  | 50 | 6.6 | 94 | INS, SW | INS | SW | SS, SW | SS, SW | INS |  |
|  | 100 | 6.6 | 89 | INS, SW | INS | SW | SS, SW | NS, SW | INS |  |
| Acrylonitrile | 25 | 6.6 | ---- | VSS | INS | SW | SS, SW | SS, SW | SW | Tough, fibrous-like materials. |
|  | 50 | 6.7 | 12 | VSS | INS | SW | SS, SW | SS, SW | SW |  |
|  | 100 | 6.7 | ---- | SS | SS | SW | SS, SW | SS, SW | SS |  |
| 2-Methyl-5-vinyl-pyridine. | 25 | 6.7 | 28 | INS | INS | SW | VSS | S | INS | Flexible, moldable plastics.[4] |
|  | 50 | 6.8 | high | INS | INS | SW | SW | SS, SW | INS, SW |  |
|  | 100 | 6.8 | high | INS | INS | SW | SW | S | INS, SW |  |

[1] Includes the butadiene/acrylic acid copolymer present in the polyelectrolyte.
[2] Symbols for solubility data: S=soluble; SS=slightly soluble; SW=swelling; INS=insoluble; VSS=very slightly soluble; NS=nearly soluble.
[3] Ethanol-toluene azeotrope.
[4] One sample was molded at 250° F. and aproximately 10,000 p. s. i. g. It gave a transparent, flexible, tough sheet about 1/16 inch in thickness. Metal adhered to it tenaciously.

From a consideration of the above specification it will be appreciated that many changes may be made in the details therein given without sacrificing any of the advantages thereof or departing from the scope of the invention.

We claim:

1. A process for preparing a graft-type polymer comprising treating an unsaturated polymer with a base to form a water-soluble salt thereof, said polymer being prepared from a polymerizable mixture which includes a conjugated diene and an unsaturated carboxy acid, the latter constituting 20–99% by weight of total monomers, and polymerizing said salt with at least one vinylidene compound in an aqueous emulsion system in the presence of a polymerization catalyst, said polymer being the sole emulsifier in the system and constituting at least 1% by weight of the polymerizable constituents therein.

2. Process of claim 1 wherein the acidic monomer is a carboxy-containing monomer selected from the group consisting of acrylic acid, haloacrylic acid, and alkyl-substituted acrylic acid.

3. Process of claim 1 wherein the conjugated diene contains 4 to 6 carbon atoms.

4. A graft-type polymer prepared according to claim 1.

5. A process for preparing a graft-type polymer comprising treating an unsaturated terpolymer prepared from a mixture containing a plurality of vinylidene compounds with a base to convert it to a water-soluble polymeric salt, at least one of said vinylidene compounds being a conjugated diene of 4 to 6 carbon atoms and at least one other being an acid selected from the group consisting of acrylic acid, halo-acrylic acid, and alkyl-substituted acrylic acid, said acid constituting 20–99% by weight of total monomers, and polymerizing said salt in an aqueous emulsion system in the presence of a polymerization catalyst with at least one vinylidene compound, said terpolymer being the sole emulsifier in the system and constituting at least 1% by weight of the polymerizable constituents thereof.

6. The process according to claim 5 wherein the terpolymer is prepared from acrylic acid, 1,3-butadiene, and styrene and the water-soluble salt of said terpolymer is polymerized with 1,3-butadiene and styrene.

7. The process according to claim 5 wherein the terpolymer is prepared from acrylic acid, 1,3-butadiene, and styrene and the water-soluble salt of said terpolymer is polymerized with 1,3-butadiene.

8. A graft-type polymer prepared according to claim 6.

9. A graft-type polymer prepared according to claim 7.

10. A process of preparing a graft-type polymer comprising the steps, in order, of treating an unsaturated copolymer of a conjugated diene containing 4 to 6 carbon atoms and an acid selected from the group consisting of acrylic acid, halo-acrylic acid, and alkyl-substituted acrylic acid with a base to convert it to a water-soluble polymeric salt, said copolymer being prepared by a recipe wherein said conjugated diene constitutes at least 5 percent by weight of the total monomers, and polymerizing said salt in an aqueous emulsion system in the presence of a polymerization catalyst with at least one vinylidene compound, said salt being the sole emulsifier in the system and constituting at least 5 percent by weight of the polymerizable constituents thereof.

11. A process according to claim 10 wherein the copolymer is prepared from acrylic acid and 1,3-butadiene, and the water-soluble salt thereof is polymerized with 1,3-butadiene and styrene.

12. A process according to claim 10 wherein the copolymer is prepared from acrylic acid and 1,3-butadiene and the water-soluble salt thereof is polymerized with 1,3-butadiene and 2-methyl-5-vinylpyridine.

13. A process according to claim 10 wherein the copolymer is prepared from acrylic acid and 1,3-butadiene, and the water-soluble salt thereof is polymerized with 1,3-butadiene.

14. A graft-type polymer prepared according to claim 11.

15. A graft-type polymer prepared according to claim 12.

16. A graft-type polymer prepared according to claim 13.

References Cited in the file of this patent

UNITED STATES PATENTS

| | | |
|---|---|---|
| 2,300,566 | Hahn et al. | Nov. 3, 1942 |
| 2,545,702 | Norris | Mar. 20, 1951 |
| 2,619,477 | Banes et al. | Nov. 25, 1952 |

FOREIGN PATENTS

| | | |
|---|---|---|
| 679,562 | Great Britain | Sept. 17, 1952 |